United States Patent
Shi et al.

(10) Patent No.: US 12,175,379 B2
(45) Date of Patent: Dec. 24, 2024

(54) METHOD, APPARATUS, DEVICE AND STORAGE MEDIUM FOR TRAINING MODEL

(71) Applicant: BEIJING BAIDU NETCOM SCIENCE AND TECHNOLOGY CO., LTD., Beijing (CN)

(72) Inventors: Hongjian Shi, Beijing (CN); Wenbin Jiang, Beijing (CN); Xinwei Feng, Beijing (CN); Miao Yu, Beijing (CN); Huanyu Zhou, Beijing (CN); Meng Tian, Beijing (CN); Xueqian Wu, Beijing (CN); Xunchao Song, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1048 days.

(21) Appl. No.: 17/119,651

(22) Filed: Dec. 11, 2020

(65) Prior Publication Data
US 2021/0390428 A1 Dec. 16, 2021

(30) Foreign Application Priority Data
Jun. 11, 2020 (CN) .......................... 202010526432.1

(51) Int. Cl.
*G06N 5/04* (2023.01)
*G06N 20/00* (2019.01)
*G06F 40/30* (2020.01)

(52) U.S. Cl.
CPC .............. *G06N 5/04* (2013.01); *G06N 20/00* (2019.01); *G06F 40/30* (2020.01)

(58) Field of Classification Search
CPC ...... G06F 16/353; G06F 16/367; G06F 40/30; G06N 20/00; G06N 3/08; G06N 5/04
See application file for complete search history.

(56) References Cited

U.S. PATENT DOCUMENTS

2016/0063395 A1 3/2016 Cheng et al.
2017/0132528 A1* 5/2017 Aslan ..................... G06N 20/00
(Continued)

FOREIGN PATENT DOCUMENTS

| CN | 110084271 A | 8/2019 |
| CN | 110427493 A | 11/2019 |

(Continued)

OTHER PUBLICATIONS

Japanese Office Action for related Application No. 2020-206144; reported on Mar. 8, 2022.
(Continued)

*Primary Examiner* — Brent Johnston Hoover
(74) *Attorney, Agent, or Firm* — von Briesen & Roper, s.c.

(57) ABSTRACT

The present disclosure discloses a method, apparatus, device, and storage medium for training a model, relates to the technical fields of knowledge graph, natural language processing, and deep learning. The method may include: acquiring a first annotation data set, the first annotation data set including sample data and a annotation classification result corresponding to the sample data; training a preset initial classification model based on the first annotation data set to obtain an intermediate model; performing prediction on the sample data in the first annotation data set using the intermediate model to obtain a prediction classification result corresponding to the sample data; generating a second annotation data set based on the sample data, the corresponding annotation classification result, and the corresponding prediction classification result; and training the intermediate model based on the second annotation data set to obtain a classification model.

13 Claims, 5 Drawing Sheets

(56) References Cited

U.S. PATENT DOCUMENTS

2019/0147350 A1    5/2019  Bai et al.
2019/0377972 A1*  12/2019  Liu .......................... G06F 18/41
2021/0124881 A1*   4/2021  Li ........................... G06N 3/045

FOREIGN PATENT DOCUMENTS

| CN | 110647937 A | 1/2020 |
| CN | 110728328 A | 1/2020 |
| CN | 111125365 A | 5/2020 |
| CN | 111210024 A | 5/2020 |

OTHER PUBLICATIONS

Chinese First Office Action related to Application No. 202010526432. 1; reported on Jul. 28, 2020.

* cited by examiner

METHOD, APPARATUS, DEVICE AND STORAGE MEDIUM FOR TRAINING MODEL

CROSS-REFERENCE TO RELATED APPLICATIONS

This application claims priority to Chinese Application No. 202010526432.1, filed on Jun. 11, 2020 and entitled "Method, Apparatus, Device and Storage Medium for Training Model," the entire disclosure of which is hereby incorporated by reference.

TECHNICAL FIELD

Embodiments of the present disclosure relate to the field of computer technology, specifically to the field of knowledge graph, natural language processing, and deep learning, and more specifically to a method, apparatus, device and storage medium for training a model.

BACKGROUND

Semantic matching technology is an important technical direction in the field of natural language processing, and also has a wide range of applications in service, serving as the cornerstone of applications. Semantic matching technology, in short, is a technology that performs similarity matching on two character strings based on the semantics of the two character strings after semantic understanding of the two character strings. Semantic matching technology not only has always occupied a very important position in the field of natural language processing, but also has a wide range of applications in a plurality of service fields such as ranking, recommendation, and Q&A, and is an indispensable part of research and service.

However, training data of a semantic matching model has always been the source of limiting its wide application in scientific research and service. In the training data of the semantic matching model, for some matching requirements of relatively vague standards, annotating the data may be more difficult. There may be a lot of wrong annotations, and there may often be a lot of noise. How to overcome the noise and train an efficient and accurate semantic matching model is a way to further promote the effect of the semantic matching model.

SUMMARY

A method, apparatus, device and storage medium for training a model are provided.

In a first aspect, an embodiment of the present disclosure provides a method for training a model, the method including: acquiring a first annotation data set, the first annotation data set including sample data and a annotation classification result corresponding to the sample data, and the sample data including text data, image data, audio data, or video data; training a preset initial classification model based on the first annotation data set to obtain an intermediate model; performing prediction on the sample data in the first annotation data set using the intermediate model to obtain a prediction classification result corresponding to the sample data; generating a second annotation data set based on the sample data, the corresponding annotation classification result, and the corresponding prediction classification result; and training the intermediate model based on the second annotation data set to obtain a classification model.

In a second aspect, an embodiment of the present disclosure provides an apparatus for training a model, the apparatus including: an acquisition unit, configured to acquire a first annotation data set, the first annotation data set including sample data and a annotation classification result corresponding to the sample data, and the sample data including text data, image data, audio data, or video data; a first training unit, configured to train a preset initial classification model based on the first annotation data set to obtain an intermediate model; a prediction unit, configured to perform prediction on the sample data in the first annotation data set using the intermediate model to obtain a prediction classification result corresponding to the sample data; a generation unit, configured to generate a second annotation data set based on the sample data, the corresponding annotation classification result, and the corresponding prediction classification result; and a second training unit, configured to train the intermediate model based on the second annotation data set to obtain a classification model.

In a third aspect, an embodiment of the present disclosure provides an electronic device for training a model, the device electronic including: at least one processor; and a memory, communicatively connected with the at least one processor, the memory storing instructions executable by the at least one processor, the instructions, when executed by the at least one processor, causing the at least one processor to perform the method according to the first aspect.

In a fourth aspect, an embodiment of the present disclosure provides a non-transitory computer readable storage medium, storing computer instructions, the computer instructions being used to cause a computer to perform the method according to the first aspect.

According to the technology of embodiments of the present disclosure, high-noise annotation data can be effectively used, to train a highly available model, and improve data utilization.

It should be appreciated that the description of the Summary is not intended to limit the key or important features of embodiments of the present disclosure, or to limit the scope of the present disclosure. Other features of the present disclosure will become readily comprehensible through the following description.

BRIEF DESCRIPTION OF THE DRAWINGS

The accompanying drawings are used to better understand the present solution and do not constitute a limitation to the present disclosure.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as illustrative only. Accordingly, it should be recognized by one of the ordinary skilled in the art that various changes and modifications may be made to embodiments described herein without departing from the scope and spirit of the present disclosure. Also, for clarity and conciseness, descriptions for well-known functions and structures are omitted in the following description.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
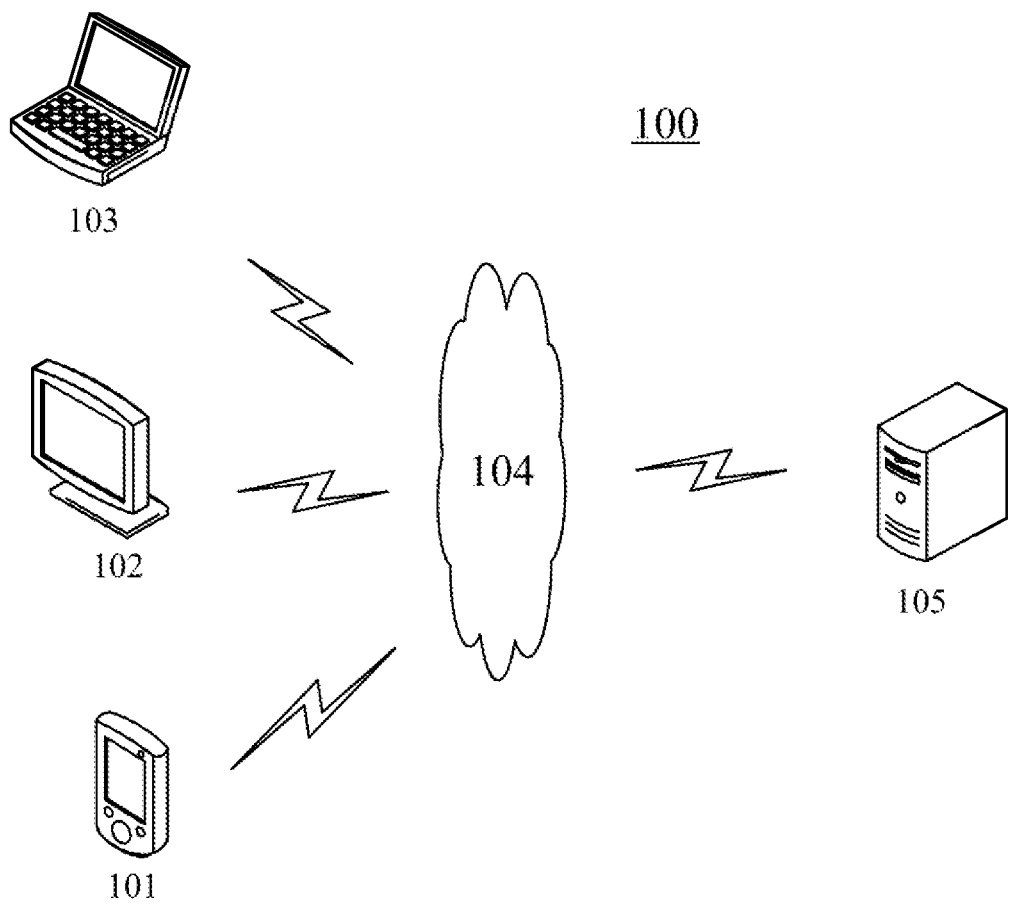
FIG. 1 is a diagram of an example system architecture in which an embodiment of the present disclosure may be implemented.

FIG. 1 illustrates an example system architecture 100 in which a method for training a model or an apparatus for training a model according to embodiments of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103 and the server 105. The network 104 may include various types of connections, such as wired or wireless communication links, or optic fibers.

A user may use the terminal devices 101, 102, 103 to interact with the server 105 through the network 104 to receive or send messages, etc. Various communication client applications, such as web browsing applications, or speech recognition applications, may be installed on the terminal devices 101, 102, 103.

The terminal devices 101, 102, 103 may be hardware or software. When the terminal devices 101, 102, 103 are hardware, the terminal devices 101, 102, 103 may be various electronic devices, including but not limited to smart phones, tablet computers, E-book readers, vehicle-mounted computers, laptop portable computers, desktop computers, and so on. When the terminal devices 101, 102, 103 are software, the terminal devices 101, 102, 103 may be installed in the electronic devices listed above. The terminal devices 101, 102, 103 may be implemented as a plurality of pieces of software or software modules (for example, for providing distributed services), or as a single piece of software or software module, which is not specifically limited herein.

The server 105 may be a server that provides various services, such as a backend server that provides a classification model on the terminal devices 101, 102, 103. The backend server may use training sample data to train an initial classification model to obtain a target classification model, and send the target classification model to the terminal devices 101, 102, 103.

It should be noted that the server 105 may be hardware or software. When the server 105 is hardware, the server 105 may be implemented as a distributed server cluster composed of a plurality of servers, or as a single server. When the server 105 is software, the server 105 may be implemented as a plurality of pieces of software or software modules (for example, for providing distributed services) or as a single piece of software or software module, which is not specifically limited herein.

It should be noted that the method for training a model provided by embodiments of the present disclosure is generally performed by the server 105. Accordingly, the apparatus for training a model is generally provided in the server 105.

It should be understood that the numbers of terminal devices, networks and servers in FIG. 1 are merely illustrative. Depending on the implementation needs, there may be any number of terminal devices, networks and servers.

Figure 2:
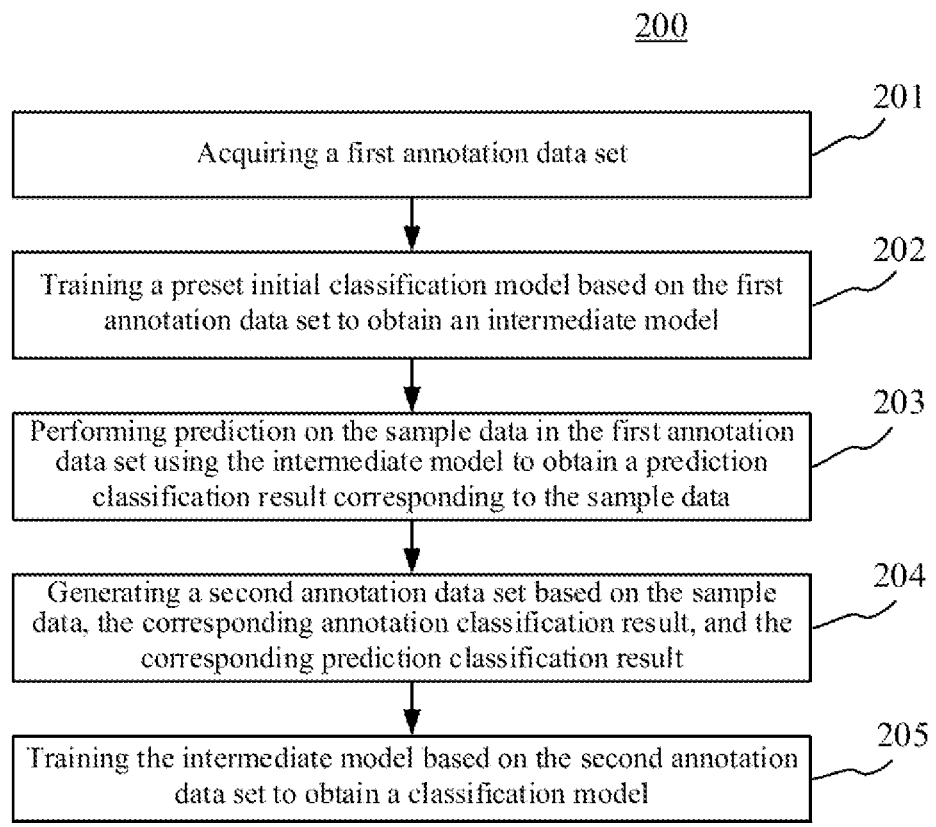
FIG. 2 is a flowchart of a method for training a model according to an embodiment of the present disclosure.

With further reference to FIG. 2, a flow 200 of a method for training a model according to an embodiment of the present disclosure is illustrated. The method for training a model of the present embodiment includes the following steps.

Step 201, acquiring a first annotation data set.

In the present embodiment, an executing body of the method for training a model (for example, the server 105 shown in FIG. 1) may first acquire the first annotation data set. The first annotation data set may include sample data and a annotation classification result corresponding to the sample data. The sample data may include text data, image data, video data, audio data, and the like. The annotation classification result may be manually annotated for the sample data, which may be used to indicate the classification to which the sample data belongs. For example, the sample data is a car image, and the annotation classification result may be "car".

Step 202, training a preset initial classification model based on the first annotation data set to obtain an intermediate model.

In the present embodiment, after obtaining the first annotation data set, the executing body may use the first annotation data set to train the preset initial classification model to obtain the intermediate model. During training, part or all of the data in the first annotation data set may be used to train the initial classification model. The executing body may use the sample data in the first annotation data set as an input of the initial classification model, and use the annotation classification result corresponding to the inputted sample data as a desired output to obtain the intermediate model. The initial classification model may include any deep learning model, such as a neural network and so on.

Step 203, performing prediction on the sample data in the first annotation data set using the intermediate model to obtain a prediction classification result corresponding to the sample data.

After training to obtain the intermediate model, the executing body may input the sample data in the first annotation data set into the intermediate model to perform prediction on the sample data in the first annotation data set. The intermediate model may determine a probability that the sample data belongs to each of preset categories, and obtain the predicted classification result. Here, the prediction classification result may include a plurality of prediction probability values, and may also include the category to which the sample data belongs. For example, the preset categories may include categories 1, 2, 3, and 4. The prediction classification result obtained by the intermediate model may be 0.2, 0.3, 0.1, 0.4, or may be category 4. Here, category 4 is the category corresponding to a maximum value of the prediction probability values.

Step 204, generating a second annotation data set based on the sample data, the corresponding annotation classification result, and the corresponding prediction classification result.

After obtaining the prediction classification result, the executing body may combine the sample data and the annotation classification result to generate the second annotation data set. It may be understood that the second annotation data set may also include the sample data and an update annotation result corresponding to the sample data. Here, the sample data in the second annotation data set may be the same as the sample data in the first annotation data set, and the update annotation result may include the annotation classification result and the prediction classification result. For example, for sample data A, the annotation classification result is 1, and the prediction classification result is 2. The second annotation data set may include sample data A and update annotation results 1 and 2.

In some alternative implementations of the present embodiment, the prediction classification result includes prediction probability values of preset categories. The executing body may generate the second annotation data set through the following steps not shown in FIG. 2: determining an update annotation result of the sample data based on the annotation classification result and the prediction probability values; and generating the second annotation data set, based on the sample data and the update annotation result.

In the present implementation, the executing body may determine the update annotation result of the sample data based on the annotation classification result and the prediction probability values. The update annotation result includes the category corresponding to the annotation classification result, as well as the prediction probability values or a predicted category. Then, the executing body may generate the second annotation data set based on the sample data and the update annotation result. Specifically, the executing body may determine the update annotation result using the following two implementations.

First implementation: arranging the prediction probability values and an category included in the annotation classification result in a preset order; and using the arrangement as the update annotation result.

In the present implementation, the executing body may arrange the prediction probability values and the category included in the annotation classification result in the preset order; and use the arrangement as the update annotation result. For example, the preset categories may include categories 1, 2, 3, and 4. The prediction classification result obtained by the intermediate model may be 0.2, 0.3, 0.1, 0.4. The category included in the annotation classification result is 3. Then, the update annotation result may be 0.2, 0.3, 0.1, 0.4, 3, or 3, 0.2, 0.3, 0.1, 0.4.

Second implementation: determining a category corresponding to a maximum value of the prediction probability values; and combining the determined category with the category included in the annotation classification result to obtain the update annotation result.

In the present implementation, the executing body may first determine the category corresponding to the maximum value of the prediction probability values. For example, the preset categories may include categories 1, 2, 3, and 4. The prediction classification result obtained by the intermediate model may be 0.2, 0.3, 0.1, 0.4, then the category corresponding to the maximum value is 4. If the category included in the annotation classification result is 3, then the update annotation result may be 4, 3.

Step 205, training the intermediate model based on the second annotation data set to obtain a classification model.

After obtaining the second annotation data set, the executing body may train the intermediate model using the second annotation data set to obtain the classification model. Specifically, if the annotation classification result is the same as the prediction classification result, the executing body may use the sample as a positive sample. If the annotation classification result is not the same as the prediction classification result, the executing body may use the sample as a negative sample. The executing body may use the positive sample and the negative sample to train the intermediate model to obtain the classification model.

Figure 3:
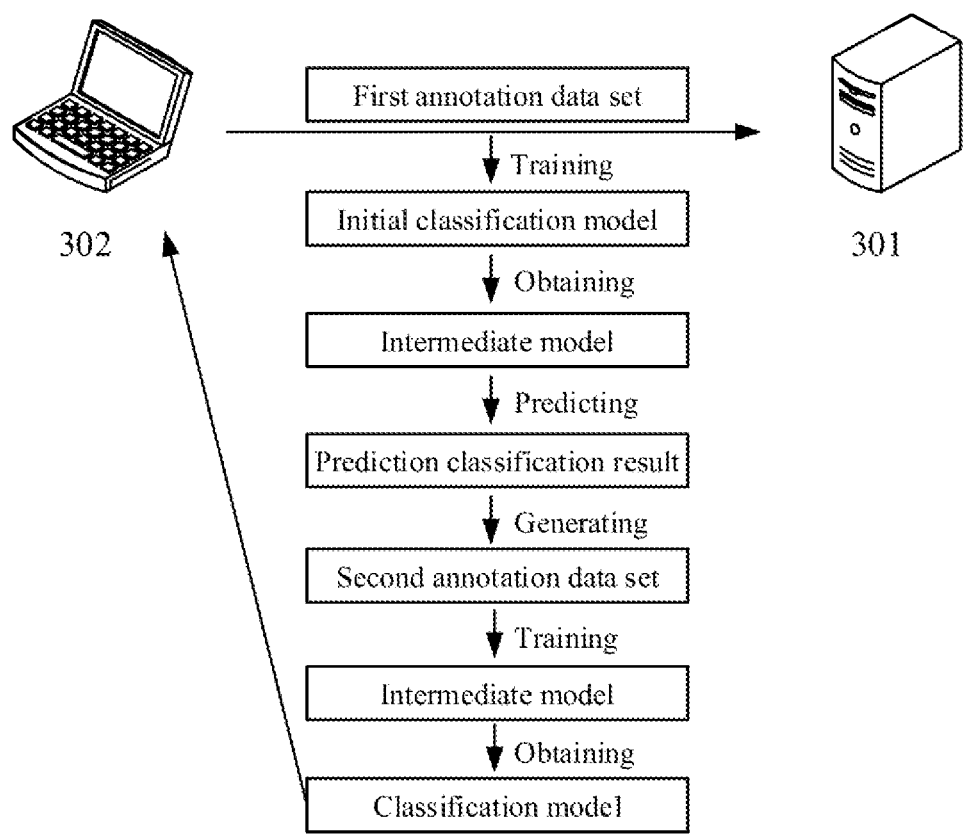
FIG. 3 is a schematic diagram of an application scenario of the method for training a model according to an embodiment of the present disclosure.

With further reference to FIG. 3, a schematic diagram of an application scenario of the method for training a model according to the present disclosure is illustrated. In the application scenario of FIG. 3, a server 301 may acquire a first annotation data set from a terminal device 302, and use the first annotation data set to train a preset initial classification model to obtain an intermediate model. Then, based on the first annotation data set and a prediction classification result, a second annotation data set is obtained. The server 301 may use the second annotation data set to continue training the intermediate model to obtain a classification model. Then, the executing body may return the classification model to the terminal device 302.

The method for training a model provided by embodiments of the present disclosure can effectively use high-noise annotation data, train a highly available model, and improve the utilization rate of data.

Figure 4:
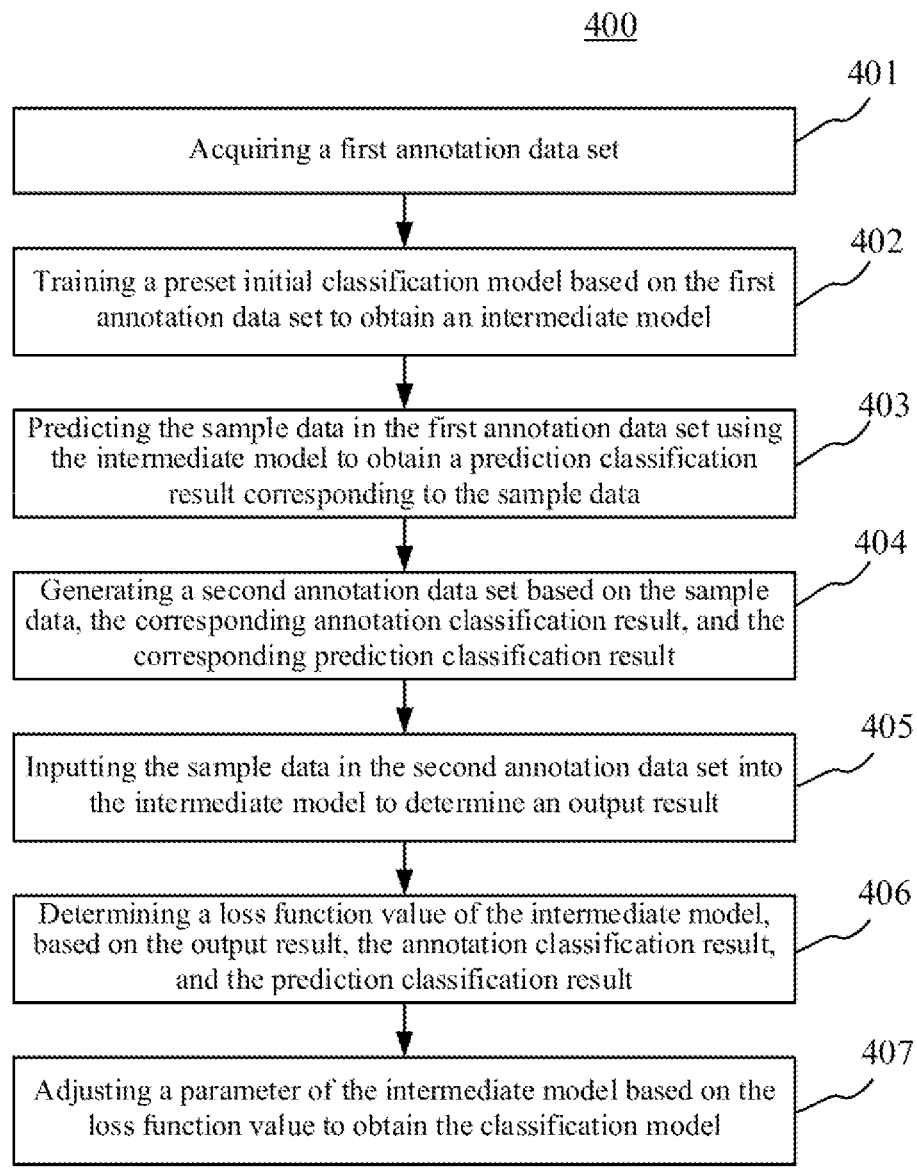
FIG. 4 is a flowchart of the method for training a model according to another embodiment of the present disclosure.

With further reference to FIG. 4, a flow 400 of the method for training a model according to another embodiment of the present disclosure is illustrated. As shown in FIG. 4, the method for training a model of the present embodiment may include the following steps.

Step 401, acquiring a first annotation data set.

Step 402, training a preset initial classification model based on the first annotation data set to obtain an intermediate model.

Step 403, performing prediction on the sample data in the first annotation data set using the intermediate model to obtain a prediction classification result corresponding to the sample data.

Step 404, generating a second annotation data set based on the sample data, the corresponding annotation classification result, and the corresponding prediction classification result.

The principles of steps 401 to 404 are similar to the principles of steps 201 to 204, and detailed description thereof will be omitted.

Step 405, inputting the sample data in the second annotation data set into the intermediate model to determine an output result.

The executing body may input the sample data in the second annotation data set into the intermediate model to obtain the output result. The output result includes a predicted probability corresponding to each classification.

Step 406, determining a loss function value of the intermediate model, based on the output result, the annotation classification result, and the prediction classification result.

In the present embodiment, the executing body may determine the loss function value of the intermediate model, based on the output result, the annotation classification result, and the prediction classification result.

Specifically, the executing body may compare the output result with the annotation classification result and the prediction classification result respectively, and determine the difference between the output result and the annotation classification result and the difference between the output result and the prediction classification result. The loss function value of the intermediate model is determined based on a comparison result having greater difference.

In some alternative implementations of the present embodiment, the executing body may determine the loss function value of the intermediate model through the following steps not shown in FIG. 4: determining a first loss function value based on the output result and the annotation classification result; determining a second loss function value based on the output result and the prediction classification result; and determining the loss function value of the intermediate model based on the first loss function value and the second loss function value.

The executing body may substitute the output result and the annotation classification result into a preset loss function to obtain the first loss function value. Here, the first loss function value may be one value or a plurality of values. When the first loss function has one value, the first loss function corresponds to the category corresponding to the maximum prediction probability value. When the first loss function has a plurality of values, the first loss function has values corresponding to the categories corresponding to the prediction probability values.

Similarly, the executing body may also substitute the output result and the prediction classification result into the preset loss function to obtain the second loss function value.

After obtaining the first loss function value and the second loss function value, the executing body may add weights the first loss function and the second loss function value to obtain a value, which is used as the loss function value of the intermediate model.

In some alternative implementations of the present embodiment, the executing body may determine the loss function value of the intermediate model through the following steps: determining a first weight corresponding to the first loss function value and a second weight corresponding to the second loss function value; and determining the loss function value of the intermediate model, based on the first weight, the second weight, the first loss function value, and the second loss function value.

In the present implementation, the first weight corresponding to the first loss function value and the second weight corresponding to the second loss function value may be determined first. Here, the first weight and the second weight may be manually inputted, or may be obtained by other algorithms (such as random algorithms, or deep learning algorithms). Then, the first weight may be multiplied by the first loss function value to obtain a product. The second weight may be multiplied by the second loss function value to obtain another product. The two products are added together, and a sum obtained is used as the loss function value of the intermediate model.

In some alternative implementations of the present embodiment, the first weight and the second weight may be determined through the following step: determining the first weight and the second weight, based on a proportion of noise data in the first annotation data set.

In the present implementation, the proportion of the noise data in the first annotation data set may further be determined. Specifically, the executing body may sample the first annotation data set multiple times. For data obtained in each sampling, whether the data is correctly annotated is determined. If the data is correctly annotated, the data is not noise data. If the data is not correctly annotated, the data is considered to be noise data. By performing statistics on the sampled data, the proportion of the noise data in the first annotation data set may be determined. Then, the executing body may determine the first weight and the second weight based on the proportion. Specifically, if the proportion of the noise data in the first annotation data set is relatively large, the value of the first weight may be appropriately reduced. If the proportion is relatively small, the value of the first weight may be appropriately increased. That is, the value of the first weight is inversely proportional to the value of the proportion.

Step 407, adjusting a parameter of the intermediate model based on the loss function value to obtain the classification model.

The executing body may adjust the parameter of the intermediate model based on the loss function value to realize optimization of the parameter of the intermediate model, thereby obtaining the classification model.

The method for training a model provided by embodiments of the present disclosure may obtain two loss function values based on the output result, and calculate the final loss function value based on the two loss function values, thereby improving the accuracy of intermediate model training and making the obtained classification model more accurate.

Figure 5:
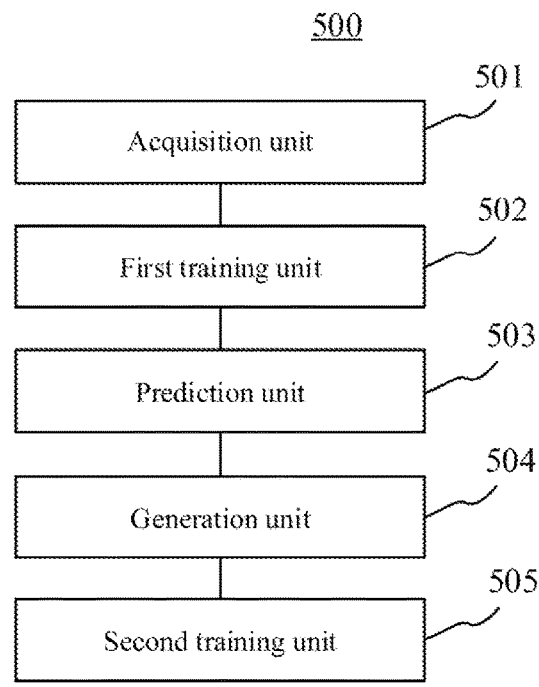
FIG. 5 is a schematic structural diagram of an apparatus for training a model according to an embodiment of the present disclosure.

With further reference to FIG. 5, as an implementation of the method shown in the above figures, an embodiment of the present disclosure provides an apparatus for training a model, and the apparatus embodiment corresponds to the method embodiment as shown in FIG. 2. The apparatus may be specifically applied to various electronic devices.

As shown in FIG. 5, an apparatus 500 for training a model of the present embodiment includes: an acquisition unit 501, a first training unit 502, a prediction unit 503, a generation unit 504 and a second training unit 505.

The acquisition unit 501 is configured to acquire a first annotation data set. The first annotation data set includes sample data and a annotation classification result corresponding to the sample data, and the sample data includes text data, image data, audio data, or video data.

The first training unit 502 is configured to train a preset initial classification model based on the first annotation data set to obtain an intermediate model.

The prediction unit 503 is configured to perform prediction on the sample data in the first annotation data set using the intermediate model to obtain a prediction classification result corresponding to the sample data.

The generation unit 504 is configured to generate a second annotation data set based on the sample data, the corresponding annotation classification result, and the corresponding prediction classification result.

The second training unit 505 is configured to train the intermediate model based on the second annotation data set to obtain a classification model.

In some alternative implementations of the present embodiment, the prediction classification result includes prediction probability values of preset categories. The generation unit 504 may further include modules not shown in FIG. 5: a determination module and a generation module.

The determination module is configured to determine an update annotation result of the sample data based on the annotation classification result and the prediction probability values.

The generation module is configured to generate the second annotation data set, based on the sample data and the update annotation result.

In some alternative implementations of the present embodiment, the determination module is further configured to: arrange the prediction probability values and a category included in the annotation classification result in a preset order; and use the arrangement as the update annotation result.

In some alternative implementations of the present embodiment, the determination module is further configured to: determine a category corresponding to a maximum value of the prediction probability values; and combine the determined category with a category included in the annotation classification result to obtain the update annotation result.

In some alternative implementations of the present embodiment, the second training unit may further include modules not shown in FIG. 5: an output result determination module, a loss function value determination module and a model training module.

The output result determination module is configured to input the sample data in the second annotation data set into the intermediate model to determine an output result.

The loss function value determination module is configured to determine a loss function value of the intermediate model, based on the output result, the annotation classification result, and the prediction classification result.

The model training module is configured to adjust a parameter of the intermediate model based on the loss function value to obtain the classification model.

In some alternative implementations of the present embodiment, the loss function value determination module is further configured to: determine a first loss function value based on the output result and the annotation classification result; determine a second loss function value based on the output result and the prediction classification result; and determine the loss function value of the intermediate model based on the first loss function value and the second loss function value.

In some alternative implementations of the present embodiment, the loss function value determination module is further configured to: determine a first weight corresponding to the first loss function value and a second weight corresponding to the second loss function value; and determine the loss function value of the intermediate model, based on the first weight, the second weight, the first loss function value, and the second loss function value.

In some alternative implementations of the present embodiment, the loss function value determination module is further configured to: determine the first weight and the second weight, based on a proportion of noise data in the first annotation data set.

It should be understood that the units 501 to 505 recorded in the apparatus 500 for training a model respectively correspond to the steps in the method described with reference to FIG. 2. Therefore, the operations and features described above for the method for training a model are also applicable to the apparatus 500 and the units contained therein, and detailed description thereof will be omitted.

According to an embodiment of the present disclosure, the present disclosure further provides an electronic device and a readable storage medium.

Figure 6:
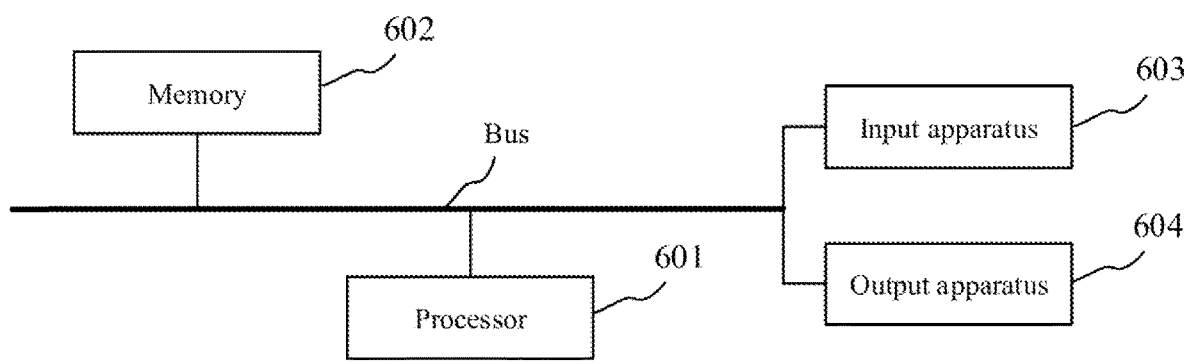
FIG. 6 is a block diagram of an electronic device for implementing the method for training a model according to an embodiment of the present disclosure.

As shown in FIG. 6, a block diagram of an electronic device that performs the method for training a model according to an embodiment of the present disclosure is illustrated. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations, for example, as a server array, a set of blade servers, or a multi-processor system. In FIG. 6, one processor 601 is used as an example.

The memory 602 is a non-transitory computer readable storage medium provided by embodiments of the present disclosure. The memory stores instructions executable by at least one processor, so that the at least one processor performs the method for training a model provided by embodiments of the present disclosure. The non-transitory computer readable storage medium of embodiments of the present disclosure stores computer instructions for causing a computer to perform the method for training a model provided by embodiments of the present disclosure.

The memory 602, as a non-transitory computer readable storage medium, may be used to store non-transitory software programs, non-transitory computer executable programs and modules, such as program instructions/modules corresponding to the method for training a model in embodiments of the present disclosure (for example, the acquisition unit 501, the first training unit 502, the prediction unit 503, the generation unit 504 and the second training unit 505 as shown in FIG. 5). The processor 601 executes the non-transitory software programs, instructions, and modules stored in the memory 602 to execute various functional applications and data processing of the server, that is, to implement the method for training a model in the foregoing method embodiments.

The memory 602 may include a storage program area and a storage data area, where the storage program area may store an operating system and at least one function required application program; and the storage data area may store data created by the use of the electronic device for training a model. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device for training a model through a network. Examples of the above network include but are not limited to the Internet, intranet, local area network, mobile communication network, and combinations thereof.

The electronic device that performs the method for training a model may further include: an input apparatus 603 and an output apparatus 604. The processor 601, the memory 602, the input apparatus 603, and the output apparatus 604 may be connected through a bus or in other methods. In FIG. 6, connection through the bus is used as an example.

The input apparatus 603 may receive input digital or character information, and generate key signal inputs related to user settings and function control of the electronic device for training a model, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various implementations of the systems and techniques described herein may be implemented in a digital electronic circuit system, an integrated circuit system, an application specific integrated circuit (ASIC), computer hardware, firmware, software, and/or combinations thereof. These various implementations may include the implementation in one or more computer programs. The one or more computer programs may be executed and/or interpreted on a programmable system including at least one programmable processor, and the programmable processor may be a dedicated or general-purpose programmable processor, may receive data and instructions from a storage system, at least one input apparatus and at least one output apparatus, and transmit the data and the instructions to the storage system, the at least one input apparatus and the at least one output apparatus.

These computing programs, also referred to as programs, software, software applications or codes, include a machine instruction of the programmable processor, and may be implemented using a high-level procedural and/or an object-oriented programming language, and/or an assembly/machine language. As used herein, the terms "machine readable medium" and "computer readable medium" refer to any computer program product, device and/or apparatus (e.g., a magnetic disk, an optical disk, a storage device and a programmable logic device (PLD)) used to provide a machine instruction and/or data to the programmable processor, and include a machine readable medium that receives the machine instruction as a machine readable signal. The term "machine readable signal" refers to any signal used to provide the machine instruction and/or data to the programmable processor.

To provide an interaction with a user, the systems and techniques described here may be implemented on a computer having a display apparatus (e.g., a cathode ray tube (CRT)) or an LCD monitor) for displaying information to the user, and a keyboard and a pointing apparatus (e.g., a mouse or a trackball) by which the user may provide the input to the computer. Other kinds of apparatuses may also be used to provide the interaction with the user. For example, a feedback provided to the user may be any form of sensory feedback (e.g., a visual feedback, an auditory feedback, or a tactile feedback); and an input from the user may be received in any form, including acoustic, speech, or tactile input.

The systems and techniques described here may be implemented in a computing system (e.g., as a data server) that includes a backend part, implemented in a computing system (e.g., an application server) that includes a middleware part, implemented in a computing system (e.g., a user computer having a graphical user interface or a Web browser through which the user may interact with an implementation of the systems and techniques described here) that includes a frontend part, or implemented in a computing system that includes any combination of the backend part, the middleware part or the frontend part. The parts of the system may be interconnected by any form or medium of digital data communication (e.g., a communication network). Examples of the communication network include a local area network (LAN), a wide area network (WAN) and the block chain network.

The computer system may include a client and a server. The client and the server are generally remote from each other and typically interact through the communication network. The relationship between the client and the server is generated through computer programs running on the respective computer and having a client-server relationship to each other.

According to the technical solution of embodiments of the present disclosure, high-noise annotation data can be effectively used, to train a highly available model, and improve data utilization.

It should be understood that the various forms of processes shown above may be used to resort, add or delete steps. For example, the steps described in the present disclosure may be performed in parallel, sequentially, or in a different order. As long as the desired result of the technical solution disclosed in the present disclosure can be achieved, no limitation is made herein.

Embodiments do not constitute a limitation to the scope of protection of the present disclosure. It should be appreciated by those skilled in the art that various modifications, combinations, sub-combinations and substitutions may be made depending on design requirements and other factors. Any modifications, equivalents and replacements, and improvements falling within the spirit and the principle of the present disclosure should be included within the scope of protection of the present disclosure.

What is claimed is:

1. A method for training a model, the method comprising:
  acquiring a first annotation data set, the first annotation data set comprising sample data and an annotation classification result corresponding to the sample data, and the sample data comprising text data, image data, audio data, or video data;
  training a preset initial classification model by using sample data in the first annotation di ta set as an input of the initial classification model, and using annotation classification result corresponding the sample data as a desired output to obtain an intermediate model;
  performing prediction on the sample data in the first annotation data set using the intermediate model to obtain a prediction classification result corresponding to the sample data;
  generating a second annotation data set based on the sample data, the corresponding annotation classification result, and the corresponding prediction classification result; and
  training the intermediate model based on the second annotation data set to obtain a classification model by:
    inputting the e data in the second annotation data set into the intermediate model to determine an hg a first loss function value based on the output result and the annotation classification result; determine loss function value based on the output result and the prediction classification result: determining the loss function value of the intermediate model based on the first loss function value and the second loss function value; and adjusting a parameter of the intermediate model based on the loss function value to obtain the classification model.

2. The method according to claim 1, wherein the prediction classification result comprises prediction probability values of preset categories; and
  the generating the second annotation data set based on the sample data, the corresponding annotation classification result, and the corresponding prediction classification result, comprises:
    determining an update annotation result of the sample data based on the annotation classification result and the prediction probability values; and generating the second annotation data set, based on the sample data and the update annotation result.

3. The method according to claim 2, wherein the determining the update annotation result of the sample data based on the annotation classification result and the prediction probability values, comprises:
arranging the prediction probability values and a category comprised in the annotation classification result in a preset order; and
using the arrangement as the update annotation result.

4. The method according to claim 2, wherein the determining the update annotation result of the sample data based on the annotation classification result and the prediction probability values, comprises:
determining a category corresponding to a maximum value of the prediction probability values; and
combining the determined category with a category comprised in the annotation classification result to obtain the update annotation result.

5. The method according to claim 1, wherein the determining the loss function value of the intermediate model based on the first loss function value and the second loss function value, comprises:
determining a first weight corresponding to the first loss function value and a second weight corresponding to the second loss function value; and
determining the loss function value of the intermediate model, based on the first weight, the second weight, the first loss function value, and the second loss function value.

6. The method according to claim 5, wherein the determining the first weight corresponding to the first loss function value and the second weight corresponding to the second loss function value, comprises:
determining the first weight and the second weight, based on a proportion of noise data in the first annotation data set.

7. An electronic device for training a model, comprising:
at least one processor; and
a memory, communicatively connected with the at least one processor;
the memory storing instructions executable by the at least one processor, the instructions, when executed by the at least one processor, causing the at least one processor to perform operations, the operations comprising:
acquiring a first annotation data set, the first annotation data set comprising sample data and an annotation classification result corresponding to the sample data, and the sample data comprising text data, image data, audio data, or video data;
training a preset initial classification model by using the sample data in the first annotation data set as an input of the initial classification model, and using the annotation classification result corresponding to the sample data as a desired output to obtain an intermediate model;
performing prediction on the sample data in the first annotation data set using the intermediate model to obtain a prediction classification result corresponding to the sample data;
generating a second annotation data set based on the sample data, the corresponding annotation classification result, and the corresponding prediction classification result; and
training the intermediate model based on the second annotation data set to obtain a classification model by: inputting the sample data in the second annotation data set into the intermediate model to determine an output result: determining a first loss function value based on the output result and the annotation classification result; determining a second loss function value based on the output result and the prediction classification result: determining the loss function value of the intermediate model based on the first loss function value and the second loss function value; and adjusting a parameter of intermediate model based on the loss function value to obtain the classification model.

8. The electronic device according to claim 7, wherein the prediction classification result comprises prediction probability values of preset categories; and
the generating the second annotation data set based on the sample data, the corresponding annotation classification result, and the corresponding prediction classification result, comprises:
determining an update annotation result of the sample data based on the annotation classification result and the prediction probability values; and
generating the second annotation data set, based on the sample data and the update annotation result.

9. The electronic device according to claim 8, wherein the determining the update annotation result of the sample data based on the annotation classification result and the prediction probability values, comprises:
arranging the prediction probability values and a category comprised in the annotation classification result in a preset order; and
using the arrangement as the update annotation result.

10. The electronic device according to claim 8, wherein the determining the update annotation result of the sample data based on the annotation classification result and the prediction probability values, comprises:
determining a category corresponding to a maximum value of the prediction probability values; and
combining the determined category with a category comprised in the annotation classification result to obtain the update annotation result.

11. The electronic device according to claim 7, wherein the determining the loss function value of the intermediate model based on the first loss function value and the second loss function value, comprises:
determining a first weight corresponding to the first loss function value and a second weight corresponding to the second loss function value; and
determining the loss function value of the intermediate model, based on the first weight, the second weight, the first loss function value, and the second loss function value.

12. The electronic device according to claim 11, wherein the determining the first weight corresponding to the first loss function value and the second weight corresponding to the second loss function value, comprises:
determining the first weight and the second weight, based on a proportion of noise data in the first annotation data set.

13. A non-transitory computer readable storage medium, storing computer instructions, the computer instructions, being used to cause a computer to perform operations, the operations comprising:
acquiring a first annotation data set, the first annotation data set comprising sample data and an annotation classification result corresponding to the sample data, and the sample data comprising text data, image data, audio data, or video data;

training a preset initial classification model by using the sample data in the first annotation data set as an input of the initial classification model, and using the annotation classification result corresponding to the sample data as a desired output to obtain an intermediate model;

performing prediction on the sample data in the first annotation data set using the intermediate model to obtain a prediction classification result corresponding to the sample data;

generating a second annotation data set based on the sample data, the corresponding annotation classification result, and the corresponding prediction classification result; and training the intermediate model based on the second annotation data set to obtain a classification model by: inputting the sample data in the second annotation data set into the intermediate model to determine an output result: determining a first loss function value based on the output result and the annotation classification result; determining a second loss function value based on the output result and the prediction classification result; determining the loss function value of the intermediate model based on the first loss function value and the second loss function value; and adjusting a parameter of the intermediate model based on the loss function value to obtain the classification model.

* * * * *